(12) United States Patent
Hung et al.

(10) Patent No.: US 8,300,713 B2
(45) Date of Patent: Oct. 30, 2012

(54) PREAMBLE SEQUENCE DETECTION AND INTEGRAL CARRIER FREQUENCY OFFSET ESTIMATION METHOD FOR OFDM/OFDMA WIRELESS COMMUNICATION SYSTEM

(75) Inventors: Kun-Chien Hung, Hsinchu (TW); David W. Lin, Hsinchu (TW)

(73) Assignee: National Chiao Tung University, Hsin-Chu (TW)

( * ) Notice: Subject to any disclaimer, the term of this patent is extended or adjusted under 35 U.S.C. 154(b) by 877 days.

(21) Appl. No.: 12/078,616

(22) Filed: Apr. 2, 2008

(65) Prior Publication Data

US 2009/0067517 A1  Mar. 12, 2009

(30) Foreign Application Priority Data

Sep. 7, 2007 (TW) .............................. 96133781 A

(51) Int. Cl.
*H04K 1/10* (2006.01)
(52) U.S. Cl. ........ 375/260; 375/259; 375/262; 375/267; 375/299; 375/316
(58) Field of Classification Search .................. 375/223, 375/242, 342, 346, 259, 260, 262, 267, 295, 375/299, 316, 324, 341, 350, 343, 224
See application file for complete search history.

(56) References Cited

U.S. PATENT DOCUMENTS

| | | | | |
|---|---|---|---|---|
| 7,627,059 B2* | 12/2009 | Niu et al. | ....................... | 375/324 |
| 7,991,083 B2* | 8/2011 | Na et al. | .......................... | 375/342 |
| 8,081,687 B2* | 12/2011 | Bagchi et al. | ................. | 375/260 |
| 2002/0186799 A1* | 12/2002 | Sayeed | .......................... | 375/345 |
| 2005/0157637 A1 | 7/2005 | Feng et al. | | |
| 2005/0271026 A1 | 12/2005 | Song et al. | | |
| 2006/0078040 A1 | 4/2006 | Sung et al. | | |
| 2006/0114812 A1 | 6/2006 | Kim et al. | | |
| 2006/0126491 A1 | 6/2006 | Ro et al. | | |
| 2006/0133321 A1 | 6/2006 | Lim et al. | | |
| 2007/0098114 A1* | 5/2007 | Hundhausen et al. | ........ | 375/326 |
| 2007/0127582 A1* | 6/2007 | Lee et al. | ....................... | 375/260 |
| 2007/0280098 A1* | 12/2007 | Bhatt et al. | ..................... | 370/208 |
| 2007/0297540 A1* | 12/2007 | Na et al. | ......................... | 375/342 |
| 2008/0260085 A1* | 10/2008 | Lin et al. | ........................ | 375/362 |
| 2009/0003308 A1* | 1/2009 | Baxley et al. | ................. | 370/350 |
| 2009/0190682 A1* | 7/2009 | Ouyang et al. | ................ | 375/262 |
| 2010/0296611 A1* | 11/2010 | Maltsev et al. | ............... | 375/343 |

OTHER PUBLICATIONS

Cox, et al. "Robust Frequency and Timing Synchronization for OFDM", IEEE Transaction Communication, vol. 45, pp. 1613-1621, (Dec. 1997).

(Continued)

*Primary Examiner* — Hirdepal Singh
(74) *Attorney, Agent, or Firm* — Birch, Stewart, Kolasch & Birch, LLP

(57) ABSTRACT

A preamble sequence detection and integral carrier frequency offset estimation method for OFDM/OFDMA wireless communication systems by formulating integral carrier frequency offset estimation and preamble sequence detection as a signal detection problem in multi-channel interference, obtaining the theoretically optimal solution, and deriving simplified, approximately optimal solutions, in which frequency-domain filtering is employed to calculate the required correlation values, which can drastically reduce the high computational complexity of the original theoretically optimal solution but result in little impact on precision. In addition, several further simplified algorithms are provided, some of which can even eliminate the use of multipliers. The using of frequency-domain filtering has high extensibility in application to related signal sequence detection problems.

11 Claims, 2 Drawing Sheets

OTHER PUBLICATIONS

Kim et al., "An Efficient Frequency Offset Estimator for OFDM Systems and Its Performance Characteristics", IEEE Transaction on Vehicular Technology, vol. 50, No. 5, pp. 1307-1312, (Sep. 2001).
Hsieh et al., "A Low-Complexity Frame Synchronization and Frequency Offset Compensation Scheme for OFDM Systems over Fading Channels", IEEE Transaction on Vehicular Technology, vol. 48, No. 5, pp. 1596-1609 (Sep. 1999).
Kwon, et al. "Initial Synchronization for WiBro", in Asia-Pacific Conference on Communications, pp. 284-288, (Oct. 2005).

* cited by examiner

PREAMBLE SEQUENCE DETECTION AND INTEGRAL CARRIER FREQUENCY OFFSET ESTIMATION METHOD FOR OFDM/OFDMA WIRELESS COMMUNICATION SYSTEM

BACKGROUND OF THE INVENTION

1. Technical Field

The present invention relates to a preamble sequence detection and integral carrier frequency offset estimation method for OFDM/OFDMA wireless communication system, particularly to a preamble sequence detection and integral carrier frequency offset estimation method for OFDM/OFDMA wireless communication system using frequency-domain filtering to calculate the required correlation values which can drastically reduce the high computational complexity of the original theoretically optimal solution.

2. Description of Related Art

The main problems that the inventors of the present invention attempts to remedy are about the traditional approaches for estimation of integral carrier frequency offset (CFO) (i.e. the integral part of the ratio of the CFO to subcarrier spacing) and detection of base station (BS) identity. The traditional approaches usually address only one of these two topics or handle them separately, resulting in inadequate efficiency and innate defects. Generally, the prior approaches for CFO estimation and/or BS identity detection can be classified into the following three types:

1. Calculate certain correlation coefficients between the received signal and some particular signals in the time domain. Based on the calculated correlation coefficients, estimate the CFO or detect the BS identity according to the related coefficients. The particular signals used in calculating the correlation coefficients are set according to the range of the CFO to be estimated and the set of codes for the BS identity to be detected. Among this type of approaches are the prior methods disclosed in [US 2006/0133321 A1, "Method and apparatus for cell search in wireless communication system," Jun. 22, 2006], [US 2006/0126491 A1, "Cell search apparatus and method in a mobile communication system using multiple access scheme," Jun. 15, 2006], [US 2006/0114812 A1, "Method and apparatus for embodying signal in mobile communication system and method for searching cell using the same," Jun. 1, 2006] and in the technical literature, [T. M. Schmidl and D. C. Cox, "Robust frequency and timing synchronization for OFDM," *IEEE Trans. Commun.*, vol. 45, pp. 1613-1621, December 1997].

2. Convert the calculation or part of the calculation in time domain as described above into equivalent calculation in the frequency domain. This approach is taken in the prior method disclosed in [US 2005/0271026 A1, "Method and apparatus for detecting a cell in an orthogonal frequency division multiple access system," Dec. 8, 2005].

3. Calculate some kind of differential correlation in the frequency domain. Then estimate the CFO or detect the BS identity based on the correlation coefficient. Among this type of approaches are the prior methods disclosed in [US 2005/0157637 A1, "Cell search method for orthogonal frequency division multiplexing based cellular communication system," Jul. 21, 2005], [US 2006/0078040 A1, "Apparatus and method for cell acquisition and downlink synchronization acquisition in a wireless communication system," Apr. 13, 2006.], [US 2006/0133321 A1, "Method and apparatus for cell search in wireless communication system," Jun. 22, 2006] and in the technical literature, [Y. H. Kim, I. Song, S. Yoon, and S. R. Park, "An Efficient Frequency Offset Estimator for OFDM Systems and Its Performance Characteristics," *IEEE Trans. Vehicullar Tech.* vol. 50, no. 5, pp. 1307-1312, September 2001], [M.-H. Hsieh and C.-H. Wei, "A Low-Complexity Frame Synchronization and Frequency Offset Compensation Scheme for OFDM Systems over Fading Channels," *IEEE Trans. Vehicular Tech.* vol. 48, no. 5, pp. 1596-1609, September 1999], and [H. Lim and D. S. Kwon, "Initial Synchronization for WiBro," in *Asic-Pacific Conf Commun.*, 2005, pp. 284-288].

In addition to the foregoing inadequate efficiency and innate defects, the prior methods have the following additional shortcomings:

1. These mentioned methods are mostly heuristic designs, without well-rounded theoretical foundation. Thus the selection of their parameters are typically conducted through heuristic or trial-and-error approaches, without firm guarantee of performance.

2. Concerning computational complexity, the first two types of approaches usually require a high complexity and the third type usually lower. However, a method that can perform well at an intermediate or even lower complexity than the third type of approaches is in want.

3. The design of some methods does not conform to the IEEE 802.16e OFDMA/WiMAX standards. Rather than commenting on each of such methods, we only briefly discuss several representative examples. For one example, in the technical literature, [T. M. Schmidl and D. C. Cox, "Robust frequency and timing synchronization for OFDM," *IEEE Trans. Commun.*, vol. 45, pp. 1613-1621, December 1997], it is assumed that there are two consecutive, known pilot symbols, with their total length approximately shorter than the channel coherence time. Moreover, only the CFO is considered but not the BS identity. Therefore, the set conditions are unsuitable. For another example, in the technical literature [M.-H. Hsieh and C.-H. Wei "A Low-Complexity Frame Synchronization and Frequency Offset Compensation Scheme for OFDM Systems over Fading Channels," *IEEE Trans. Vehicular Tech.* vol. 48, no. 5, pp. 1596-1609, September 1999], it is assumed that there is some kind of relation between the channel responses at neighboring subcarriers. Again, only the CFO is considered but not the BS identity. Therefore, the set conditions thereof are also unsuitable. For yet another example, the algorithm described in [US 2005/0271026 A1, "Method and apparatus for detecting a cell in an orthogonal frequency division multiple access system," Dec. 8, 2005] is unclear and over-abbreviated. It provides no definite design geared to the signal characteristics of IEEE 802.16e OFDMA/WiMAX. Thus this prior algorithm is impracticable in this regard.

SUMMARY OF THE INVENTION

In view of the above shortcomings of the prior technology, the present invention proposes methods for preamble sequence detection and integral carrier frequency offset (CFO) estimation for OFDM/OFDMA wireless communication systems. In multi-cell OFDM/OFDMA wireless communication systems, any subscriber station (SS) or mobile station (MS) that intends to enter the system needs to establish time and frequency synchronization with the base station (BS) and obtain the identification code of the BS, where in frequency synchronization one usually needs to estimate the fractional CFO and the integral CFO. ("Fractional" and "integral" refer to, respectively, the fractional and the integral parts of the ratio of the CFO to subcarrier spacing.) The present invention assumes that the SS first does timing and fractional CFO synchronization and then conducts integral CFO estimation and BS identity detection. Thus, the present invention is focused on integral CFO estimation and BS identity detection.

The traditional solutions usually address only one of the two topics (i.e. integral CFO estimation and BS identity detection) or handle the two topics separately. The present invention considers both topics, and handles the two topics jointly.

The present invention formulates the problem as a signal detection problem in multi-channel interference and obtains the theoretically optimal solution. It also derives simplified, approximately optimal solutions. One feature of the present invention is that it employs frequency-domain filtering to calculate the required correlation values and the decision metrics so as to drastically reduce the high computational complexity of the original theoretically optimal solution but result in little impact on precision. In addition, the present invention proposes several further simplified algorithms, some of which can even eliminate the use of multipliers.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

1. Background

Figure 1:
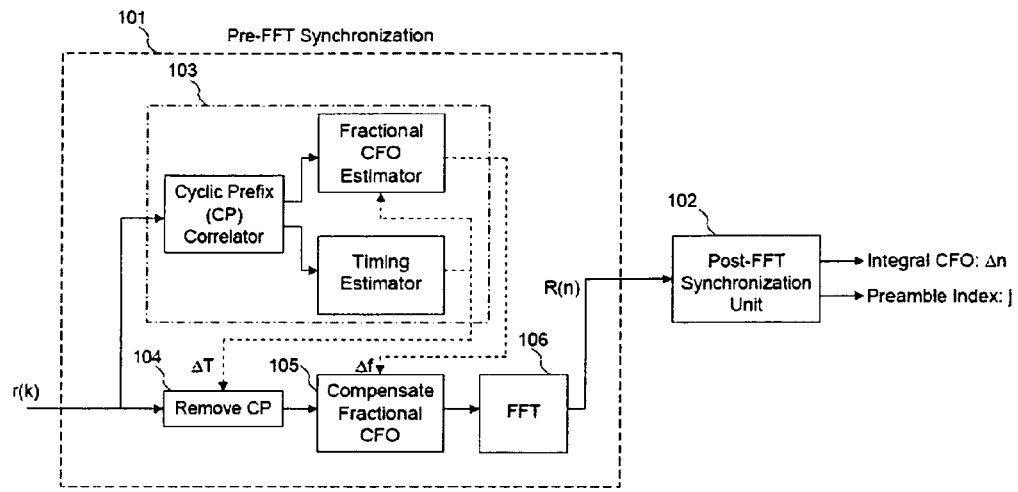
FIG. 1 illustrates the Structure of Initial DL Synchronization Method.

When a subscriber station (SS) or a mobile station (MS) tries to enter the cellular system, there are at least three tasks to be done. (Since there is no need to distinguish between SS and MS for the present invention, the following will use SS to indicate both SS and MS for convenience.) First, the SS should synchronize to the base station (BS). Then, the SS must detect certain BS parameters, of which the first is the cell identification code. Finally, the SS acquires information regarding the ranging resource and performs the initial ranging procedure. In WiMAX systems based on the IEEE 802.16e orthogonal frequency-division multiple access (OFDMA) physical layer (PHY) specifications, downlink (DL) synchronization involves synchronization of carrier frequency and timing and the cell identification code is divided into a cell identification number (IDcell) and a segment number.

A simple way to estimate the OFDM/OFDMA symbol time is blind cyclic prefix (CP) correlation, which can estimate the fractional carrier frequency offset (CFO) at the same time, where fractional CFO is the fractional part of the CFO normalized to subcarrier spacing. Therefore, one way to achieve the required DL synchronization and cell identification is to first estimate the OFDM/OFDMA symbol time and the fractional CFO, and second estimate the integral CFO (i.e., integral part of the CFO normalized to subcarrier spacing) and acquire the IDcell and the segment. The present invention is concerned mainly with the second issue.

In IEEE 802.16e OFDMA/WiMAX, the IDcell information (38 in all) and the segment information (3 in all) are carried in the 114 selectable DL preamble sequences. The index of the preamble sequence defines the IDcell (32 in all) and the segment (3 in all). Hence, the so-called cell search or cell identification in the SS is achieved by detecting the preamble sequence used by the BS.

The present invention models the joint problem of integral CFO estimation and preamble detection as a problem of sequence detection in unknown multi-path channel or multi-path Rayleigh fading channel and obtains several sequence detection algorithms based on the maximum-likelihood (ML) approach.

2. Proposed Approach to Joint Integral CFO Estimation and Preamble Detection

At the receiver, the received preamble sequence (in baseband, sampled form) can be expressed as $$r(n) = \sum_{k=0}^{K-1} \alpha_k x(n - d_k) + w(n),$$

where $X(n)$ is the transmitted sequence subject to unknown integral CFO, $\alpha_k$ and $d_k$ are the unknown gain and delay of the k-th channel path, respectively, and $w(n)$ is the additive noise. The noise $w(n)$ is assumed to be white complex Gaussian (i.e., AWGN) for convenience of mathematical derivation, but this assumption does not limit the application of the resulting derived methods to situations where this assumption holds or does not hold. Due to cyclic prefixing, the received data can also be expressed as $$r(n) = \sum_{k=0}^{K-1} \alpha_k x(n - d_k)_N + w(n),$$

in which N is the length of the block and $(n)_N$ denotes the modulo N operation.

The problem at hand is one of sequence detection, where the candidates are all possible preambles (114 in total) shifted in the frequency domain by all possible integral CFO values (whose number depends on the operating condition of the system). The present invention seeks to find the most likely sequence from the observed data. Let $x_j(n)$ be the j-th candidate in the sequence set. Based on the ML approach, under unknown path delays and unknown path coefficients for the channel, the ML detector (MLD) metric is given by $$M(x_j) = \sum_{k=0}^{L-1} |y_j(k)|^2$$

where $$y_j(k) = \sum_{n=0}^{N-1} r(n) x_j(n-k)_N.$$

This metric has been used in some detection methods.

If the power-delay profile (PDP) of the multi-path channel is known, then the present invention can average the MLD metric over all channels, which results in the weighted MLD metric $$M(x_j) = \sum_{k=0}^{N-1} W_k |y_j(k)|^2$$

where $W_k$ is the average power of the path with k samples of path delay.

In practice, the actual channel PDP may be unknown. Then the present invention may seek to estimate it or the present invention may use a suitable alternative setting for the $W_k$. In the latter case, the present invention may consider using a exponentially decaying $W_k$, for example, because such a sequence captures the essential PDP characteristics of some wireless channels. By Parseval's theorem and the modulation/multiplication theorems in the discipline of Signals and Systems, $M(x_j)$ can be interpreted as the energy of a frequency-domain-filtered version of the discrete Fourier transform (DFT) of $y_j(k)$. This opens up other ways of setting $W_k$. Specifically, in this last view, the present invention may consider setting the weighting function as $$W_k = \left| \sum_{n=0}^{N_{tap}-1} f_n e^{\frac{j2\pi kn}{N}} \right|^2.$$

where $f_n$, n=0, 1, ..., $N_{tap}-1$, are the tap coefficients of the frequency-domain filter used to filter the DFT of $y_j(k)$. Then the metric becomes $$M(x_j) = \sum_{k=0}^{N-1} W_k |y_j(k)|^2 = \sum_{k=0}^{N-1} \left| \sum_{n=0}^{N_{tap}-1} \left( f_n e^{\frac{j2\pi kn}{N}} \right) y_j(k) \right|^2$$

and it is equal to the following based on Parseval's theorem:

$$M(x_j) = \sum_{k=0}^{N-1} \left| F\left\{ \sum_{n=0}^{N_{tap}-1} \left( f_n e^{\frac{j2\pi kn}{N}} \right) y_j(k) \right\} \right|^2 = \sum_{n=0}^{N-1} |\{f_n * Y_j(n)\}|^2,$$

in which F{ } denotes the DFT operation, * denotes the (circular) convolution operation and $Y_j(n)$ is the frequency spectrum (i.e., DFT) of $y_j(k)$. Now, the DFT of $y_j(k)$ can be obtained as $$Y_j(n) = X^*_j(n) R(n)$$

where $X_j(n)$ and $R(n)$ are the DFTs of $x_j(n)$ and $r(n)$, respectively.

In short, the metric now becomes the energy of the product of $X_j(n)$ and $R(n)$ filtered by a pre-defined filter in the frequency domain. The present invention may select an easily implementable low-pass filter as the weighting filter. For example, a simplest low-pass filter is a two-tap moving average filter. The prior art of employing differential correlation in sequence detection corresponds to using a two-tap moving average filter in the frequency domain with the following response:

$$f_n = \frac{1}{2}\delta(n) + \frac{1}{2}\delta(n-1),$$

3. Embodiments

The present invention considers a multi-stage approach to the task of initial DL synchronization. The first stage estimates the OFDMA symbol timing and fractional CFO using a suitable method, such as the CP correlation method described in J. van de Beek, M. Sandell, and P. O. Borjesson, "ML estimation of 25 time and frequency offset in OFDM systems," *IEEE Trans. Signal Processing*, vol. 45, pp. 1800-1805, July 1997, or that described in J.-C. Lin, "Maximum-likelihood frame timing instant and frequency offset estimation for OFDM communication over a fast Rayleigh fading channel," *IEEE Trans. Vehicular Technology*, vol. 52, no. 4, pp. 1049-1062, July 2003. The second stage employs the joint integral CFO and preamble detection method proposed in the last section. These two stages are illustrated in BRIEF DESCRIPTION OF THE DRAWINGS The invention as well as a preferred mode of use, further objectives and advantages thereof, will best be understood by reference to the following detailed description of an illustrative embodiment when read in conjunction with the accompanying drawings, wherein:

FIG. 1 the structure of initial DL synchronization method. The overall DL synchronization procedure may include additional stages subsequently for further refinement of various estimates, but they are not considered herein. The present invention calls the first stage pre-FFT synchronization (101) and the second stage post-FFT synchronization (102). The set of components labeled 103 is used for the CP-correlation based estimation of OFDMA symbol timing and fractional CFO as described above. The estimated timing can be used to remove the CP from the received signal (104) and the estimated fractional CFO can be used to compensate the fractional CFO in the CP-removed signal (105), as are commonly done in prior art. The resulting OFDMA symbol is discrete-Fourier transformed (106), usually via a fast Fourier transform (FFT) technique. This work concerns mainly the post-FFT synchronization. The main technique in the post-FFT synchronization is the sequence detection algorithm using frequency domain filtering concept.

As mentioned, in IEEE 802.16e OFDMA/WiMAX there are 114 selectable preamble sequences for each selectable FFT size. These preamble sequences are pseudo-random binary sequences, which are modulated using a boosted BPSK modulation and placed in the carrier set defined according to the used segment. Specifically, the preamble carrier set is defined by 3n+s in which s is the preamble carrier set index and n is the running index of the preamble sequence, and the preamble datum located at the DC subcarrier is discarded. For the case of 1024-point FFT systems, the length of preamble sequences is 284 and the preamble data are placed at the subcarriers indexed (86:3:935)+s. The preamble sequences at all integral CFOs are nearly mutually orthogonal. Thus the present invention considers the preamble sequences at all integral CFOs as different sequences and search for the best match according to a metric.

Figure 2:
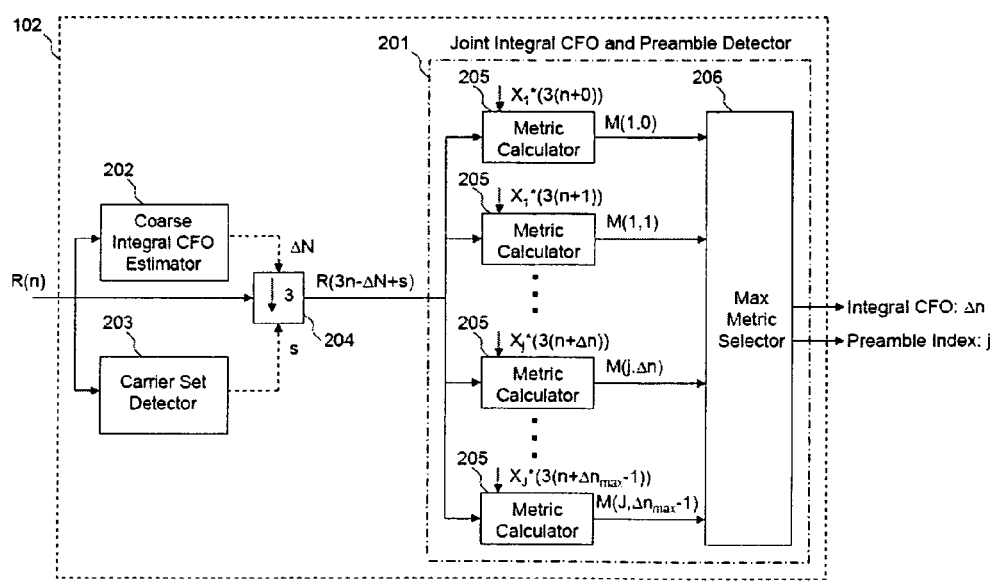
FIG. 2 illustrates the Structure of Searcher for Joint Integral CFO and Preamble Detection and several related components.

The basic architecture of the joint integral CFO and preamble detector (201) is illustrated in the right half of FIG. 2. The left part shows two optional add-on units (202 and 203) for potential complexity reduction, wherein coarse estimations of the integral CFO and the carrier set location in the frequency domain are obtained. Either one, or both, or neither of the two add-on units may be implemented depending on the implementer's choice. Then, since only every third subcarrier can be nonzero in a carrier set, the present invention down-samples the input data to the joint integral CFO and preamble detector by a factor of 3 (204). After the optional add-on units, for each candidate sequence defined by a preamble index and a possible integral CFO, the decision metric is obtained by a metric calculation module (205), where J denotes the number of preamble sequences searched and $\Delta n_{max}$ denotes the number of integral CFO values searched. Finally, the sequence with the maximum metric is selected (206). The present invention uses the previously described technique of frequency-domain filtering in calculating the metric values.

Concerning the coarse integral CFO estimator in the add-on units, one way to realize the estimation is by finding the edges of the guard-bands of the OFDM/OFDMA symbol, where the guard bands contain only null subcarriers. Therefore, one embodiment of the the coarse CFO estimator is given by $$\Delta N = \underset{\Delta N}{\mathrm{argmax}}\{|R(\Delta N)|^2 - |R(\Delta N - 1)|^2 + |R(\Delta N + 3N_p - 3)|^2 - |R(\Delta N + 3N_p - 2)|^2\}$$

where $N_p$ is the length of preamble sequence; for example, it is 284 in 1024-point FFT systems. For simplicity, one-norm edge detector can also be considered, which gives another embodiment as $$\Delta N = \underset{\Delta N}{\mathrm{argmax}}\{|R(\Delta N)| - |R(\Delta N - 1)| + |R(\Delta N + 3N_p - 3)| - |R(\Delta N + 3N_p - 2)|\}$$

with $$|R|_1 = |\Re(R)| + |\Im(R)|.$$

Concerning the carrier set detector, one way to realize the detection is by finding the carrier set with maximum energy. Therefore, one embodiment of the detector is by employing the algorithm $$s = \arg\underset{s \in \{0,1,2\}}{\max}\left\{\sum_{n=0}^{N_p-1} |R(3n+s)|^2\right\}.$$

Similarly, a one-norm version can also be considered, which gives an embodiment employing the algorithm $$s = \arg\underset{s \in \{0,1,2\}}{\max}\left\{\sum_{n=0}^{N_p-1} |R(3n+s)|\right\}.$$

Figure 3:
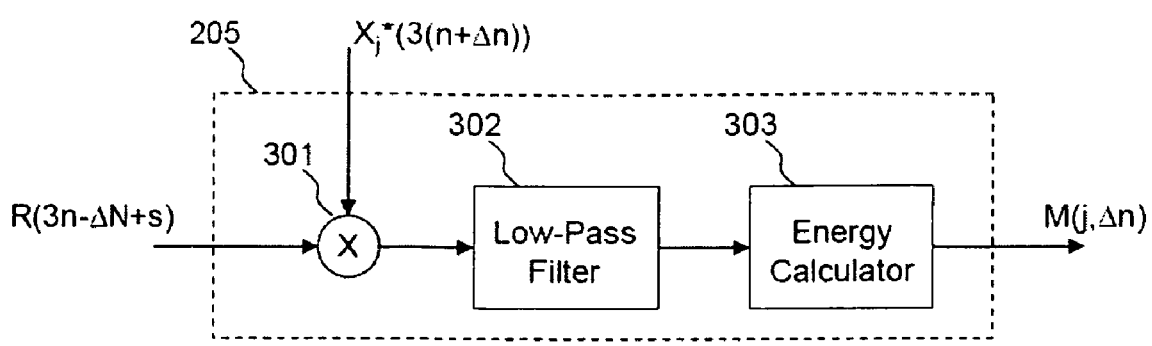
FIG. 3 illustrates the Metric Calculation Based on Frequency Domain Filtering.

The structure of the metric calculator is illustrated in FIG. 3. The down-sampled signal is point-wise multiplied with the test sequence (301). Actually, no multiplier is needed in the case of IEEE 802.16e OFDMA/WiMAX since the preamble data are BPSK modulated and the conjugation operation here has no effect on real numbers. Then the low-pass filter (302) with fixed coefficients is applied, which has the effects of noise reduction and preservation of channel response. Finally, the energy calculator (303) obtains the decision metric. In one embodiment, it can calculate the squared 2-norm. If a lower complexity is desirable, then, as an alternative embodiment, it can calculate the 1-norm instead.

Further simplifications of the basic structure above can also be employed. For example, one way to further reduce the complexity is to use a down-sampled version of the filter output as the input to energy calculation. For instance, the present invention can consider using the $N_{tap}$-fold down-sampled version of filter output for energy calculation. Then the present invention only needs to calculate the energy of $$\frac{1}{N_{tap}}$$

of the samples of the filter output.

For another example, the present invention can divide the input to the energy calculator into fixed-length sections (or windows) and compare the partial energy obtained after each section with some threshold. Candidates that perform below the threshold are dropped. This continues until only one candidate remains or until the present invention come to the end of the last window when all the surviving candidates will be compared. The method resembles, to some extent, certain reduced-complexity breadth-first tree search methods. It can drop very poor candidates early on, resulting in reduced complexity for the overall procedure.

What is claimed is:

1. A preamble sequence detection and integral carrier frequency offset (CFO) estimation method for an OFDM/OFDMA wireless communication system, the method comprising:
    formulating the preamble sequence detection and integral CFO estimation as a single problem of sequence detection in known or unknown multi-path channel or multi-path Rayleigh fading channel;
    applying a frequency domain filtering of a low-pass character to each of a plurality of candidates sequence to calculate decision metrics in each of a plurality of metric calculator modules; and
    selecting a sequence with a maximum decision metric, wherein the sequence with the maximum decision metric is obtained based on a maximum likelihood approach.

2. The method of claim 1, wherein responses of the frequency domain filtering having diverse lengths can be adopted according to computational complexity and accuracy of the decision metric required by the system.

3. The method of claim 1, wherein the frequency domain filtering is a moving average filter of any length so as to eliminate a use of a multiplier.

4. The method of claim 1, wherein a 1-norm is used to in place of a 2-norm square for calculating the decision metrics so as to eliminate a use of a multiplier.

5. The method of claim 1, further comprising the step of downsampling to acquire a part of signal points in a symbol period for calculating norms required for calculating the decision metric so as to reduce the complexity of calculation of the decision metric.

6. The method of claim 1, wherein a threshold is set and partially calculated norms in the calculation of the decision metric are compared with the threshold so as to weed out incompetent candidate sequences and reduce the computational complexity.

7. The method of claim 1, wherein edge detection composed of either coarse CFO detection or carrier-set detection or both is used to roughly estimate the integral CFO and the frequency domain filtering is used to precisely detect the integral CFO and base station (BS) identity so as to reduce the amount of integral carrier frequency offsets to be tested.

8. The method of claim 7, wherein in the edge detection, a 1-norm is used in place of a 2-norm square for calculating the metric so as to eliminate a use of a multiplier for calculating the integral CFO.

9. The method of claim 1, wherein the sequence detection method is applied to the estimation of integral CFO or a detection of base station (BS) identity (including cell identification (IDcell) and segment) or their combination in IEEE 802.16e OFDMA/WiMAX downlink signal reception.

10. The method of claim 1, wherein the frequency domain filtering of the low-pass character is performed by a two-tap moving average filter.

11. A multi-stage method to the downlink synchronization and the BS identification for an OFDM/OFDMA wireless communication system such as the IEEE 802.16e OFDMA/WiMAX, the method comprising:
 a first step performed by a first stage, of cyclic prefix (CP) correlation method to estimate a symbol timing and a fractional CFO; and
 a second step performed by a second stage, of joint integral CFO and preamble sequence detection,
 wherein the method of claim 1 is employed for the joint integral CFO and preamble sequence detection.

* * * * *